United States Patent [19]

Rau

[11] Patent Number: 5,066,916
[45] Date of Patent: Nov. 19, 1991

[54] TECHNIQUE FOR SEPARATING ELECTROMAGNETIC REFRACTED SIGNALS FROM REFLECTED SIGNALS IN DOWN HOLE ELECTROMAGNETIC TOOLS

[75] Inventor: Rama N. Rau, League City, Tex.

[73] Assignee: Halliburton Logging Services, Inc., Houston, Tex.

[21] Appl. No.: 463,204

[22] Filed: Jan. 10, 1990

[51] Int. Cl.$^5$ .............................................. G01V 3/30
[52] U.S. Cl. ..................................... 324/338; 324/337
[58] Field of Search ......... 324/329, 333, 334, 337–339

[56] References Cited

U.S. PATENT DOCUMENTS

| | | | |
|---|---|---|---|
| 3,582,766 | 6/1971 | Iizuka | 324/338 |
| 3,944,910 | 3/1976 | Rau | 324/338 |
| 4,383,220 | 5/1983 | Baldwin | 324/338 |
| 4,600,887 | 7/1986 | Baldwin et al. | 324/333 |
| 4,728,897 | 3/1988 | Gunton | 324/329 |
| 4,812,850 | 3/1989 | Gunton et al. | 324/337 X |

Primary Examiner—Gerard R. Strecker
Attorney, Agent, or Firm—William J. Beard

[57] ABSTRACT

In a logging tool which transmits electromagnetic radiation into adjacent formations, and including such tools which operate as low as 20 Khz (typical for induction logs) up to as high as the gigahertz range, an improved antenna system is set forth. The antenna preferably transmits a circular polarized signal so that reflected and refracted return constituents in the receiver signal can be sorted out. For intermediate frequencies, the antenna can be potted in a high dielectric constant material.

12 Claims, 2 Drawing Sheets

FIG.1

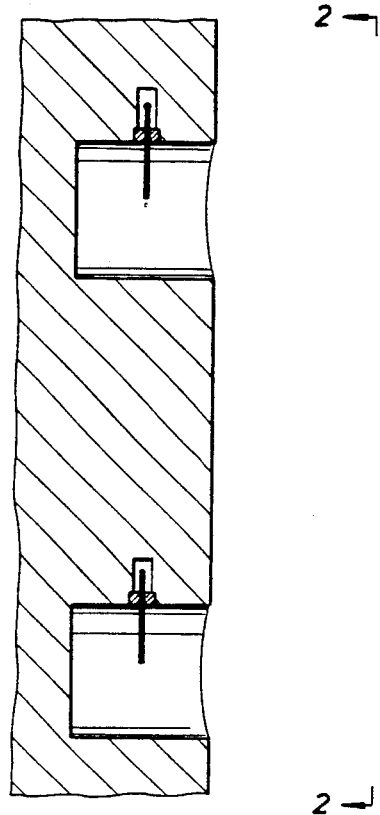
FIG. 3
FIG. 2
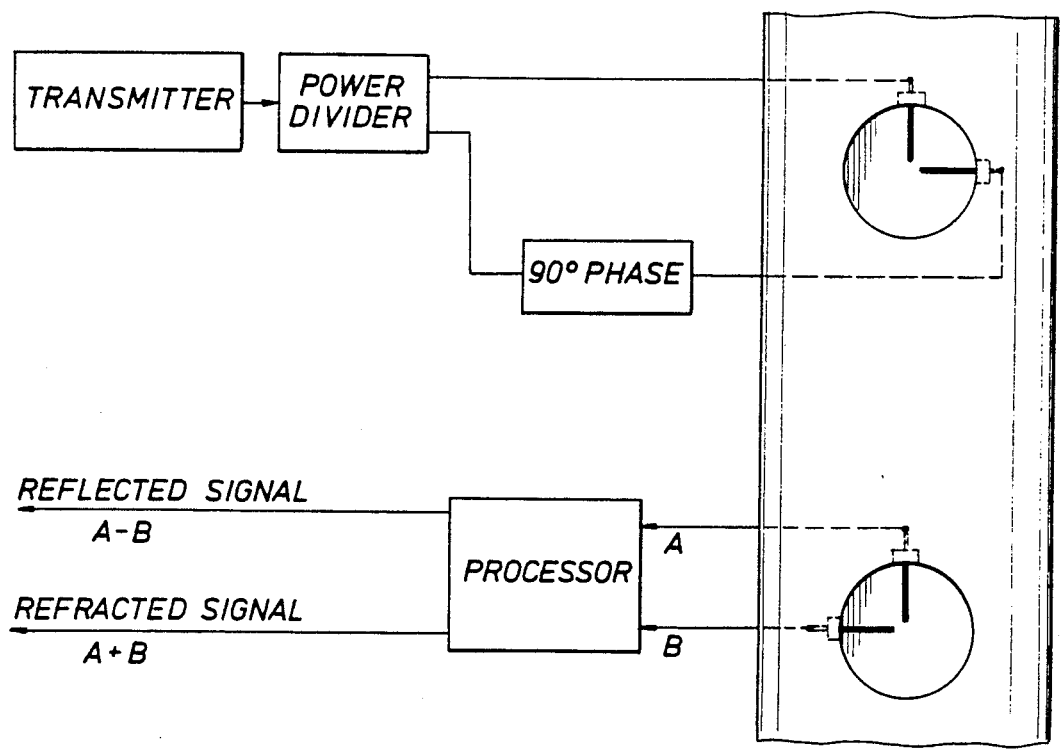

TECHNIQUE FOR SEPARATING ELECTROMAGNETIC REFRACTED SIGNALS FROM REFLECTED SIGNALS IN DOWN HOLE ELECTROMAGNETIC TOOLS

BACKGROUND OF THE DISCLOSURE

The present disclosure sets out an approach for separating reflected signals from refracted signals in well borehole electromagnetic tools. A typical tool used in these circumstances can have a frequency as high as several Ghz down to the Mhz range, and even lower in frequency. Generally, they transmit an EM field into formations adjacent to a well borehole utilizing a magnetic dipole antenna either arranged parallel to the axis of the well or horizontally positioned transverse to the axis or a combination of antennas or axes. The normal circumstances in which this device is used involves transmission from a logging tool sonde through a mud cake or invaded zone. The problem referred to is found in all formations including those where a mud cake is formed and also those where drilling fluid invasion into the adjacent formations does occur. The EM field directed from a transmitter antenna in a logging sonde must extend from the antenna into the formation. This requires EM propagation traversing the interface between the borehole and the adjacent formation. There is at least a first interface. This interface is defined by the drilling fluid and the adjacent formation. In some instances, there will be a distinct mud cake and region adjacent to the borehole where the filtrate from the drilling mud has penetrated. Sharply or poorly defined regions occur and hence, there may be multiple concentric interfaces. This becomes important as the EM frequency increases to the Ghz range. It also can be a substantial problem for lower frequencies for reasons described below.

In general, the EM radiation travels through the surrounding materials as a reflected and a refracted wave. In general terms, the mode of EM radiation and transmission is one of two types of signals, or both types mixed together. In one type, a refracted wave travels through the immediate or adjacent medium and is incident at the interface at the critical angle. The wave will be totally internally reflected and then travel along the interface between the two media (recall that this is a surrounding cylinder) wherein the travel velocity is defined by physical properties of the respective media. Wave energy scattering occurs at the media interface back into the first medium.

Another type of wave is obtained from pole contribution and thus is the remaining energy in the emitted EM wave which did not pass through the interface and is not incident at the critical angle. This wave is reflected at the interface, and is described hereinafter as the reflected wave. At various locations within the first medium, the total EM signal is a combination of the refracted and reflected waves.

There is the possibility dependent on the physical dimensions of the borehole and the wave length of the associated EM radiation that the reflected wave is an evanescent wave which cannot propagate out of the first medium. If the first medium is substantially thick (in multiples of one wave length), the EM radiation may be attenuated completely before the wave reaches the surrounding cylindrical interface. In that instance, there will be no refracted wave. It is difficult to know in advance whether there will be both reflected and refracted waves. Thus, one must assume that both waves exist within the first medium. This inevitably suggests all data has error. The error is trivial if one of the two waves is quite small; since relative size cannot be known in advance, one must presume that both waves are substantial and that the interference between the reflected and refracted waves is substantial. Accordingly, the interference may well cause substantial error in measurements of electrical properties otherwise obtained by the EM wave propagated in the well borehole.

The present disclosure sets forth an approach enabling the reflected and refracted waves to be measured separately. By use of this, the electrical properties of the media can be measured and the measurements can be separated so that the responses to reflected and refracted waves are both obtained. In part, this is accomplished by utilization of a polarized EM transmission into the formations. Circular polarization is preferred, and obtains a polarized response. Assume that the polarization is in the clockwise direction. On transmission, any reflections provide a reflected wave with a counterclockwise rotation. It is possible to distinguish this kind of received reflected signal. By contrast, refraction does not involve the image reversal of reflection and hence the refracted signal will carry with it the circulate polarization in the clockwise direction. This can be accomplished by simply injecting a signal from a magnetic dipole along the radial axis of the borehole. There are well known spiral or helical antenna assemblies available which will impart the desired circular polarization. Obviously, the polarization can be counterclockwise also.

Another important feature of the present apparatus is the use of an antenna which is enclosed within a material providing a dielectric constant substantially in excess of one. For instance, when operating in the gigahertz range, one wave length is quite short and it is easy to position a gigahertz range antenna within a borehole. However, at lower frequencies, perhaps in the range of 20 to 100 Mhz, another problem is encountered. One wave length is quite long and certain practical considerations come into play regarding positioning such an antenna in a typical borehole. The free space wave length at 30 Mhz is about 30 meters. It is difficult, and practically impossible to design and position a spiral or helical antenna for a tool fitting in a typical borehole from typically having a diameter of up to about eight or nine inches. However, scaling down of the antenna can be obtained by surrounding the antenna with a high dielectric constant material. For instance, a ceramic known as PZT4 can be used to provide a surrounding volume for an antenna where the dielectric constant is 1300. In that event, a helical antenna can be provided with a diameter of about 3.4 inches. A pad or skid mounted antenna thus would fit in a cylinder of about 3.4 inches and have a length of about 3 inches and would output a circular polarized field. The antenna can be multiplexed or alternately a receiver antenna can be affixed on another pad. Dependent on the direction of winding of the helix, a refracted or reflected signal can be obtained by the receiver. Separation of reflected and refracted signals particularly enhances the dielectric response of tools typically operating in the range of about 10 to about 200 Mhz. This is particularly helpful in sorting out the dimensions of the invaded zone concentric about the borehole.

By contrast, when operating at UHF, the signal is typically impacted by the mud cake. By utilizing circular polarized antennas to transmit and receive, the mud cake impact for dielectric measuring tools operating in the gigahertz range can be markedly improved. Going to the very lowest frequencies, typically induction tools which operate at 20 Khz, circular polarization of the transmitted signal can be utilized to inject the radiation into the formation at a controlled depth beyond the invaded zone so that measurements can be obtained both from the invaded regions of the formation and the univaded regions. Separate measurements can be obtained in light of the fact that the reflected and refracted signals can be sorted out. In summary, circular polarization assists markedly in sorting out reflected and refracted waves and thereby permits obtaining more accurate data.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 2 shows schematically an embodiment of the transmitter and receiver antennas with the phasing circuits to extract the refracted and reflected waves; and FIG. 3 is an enlarged detailed view of a transmitter antenna which is identical to a receiver antenna.

DETAILED DESCRIPTION OF THE PREFERRED EMBODIMENT

Figure 1:
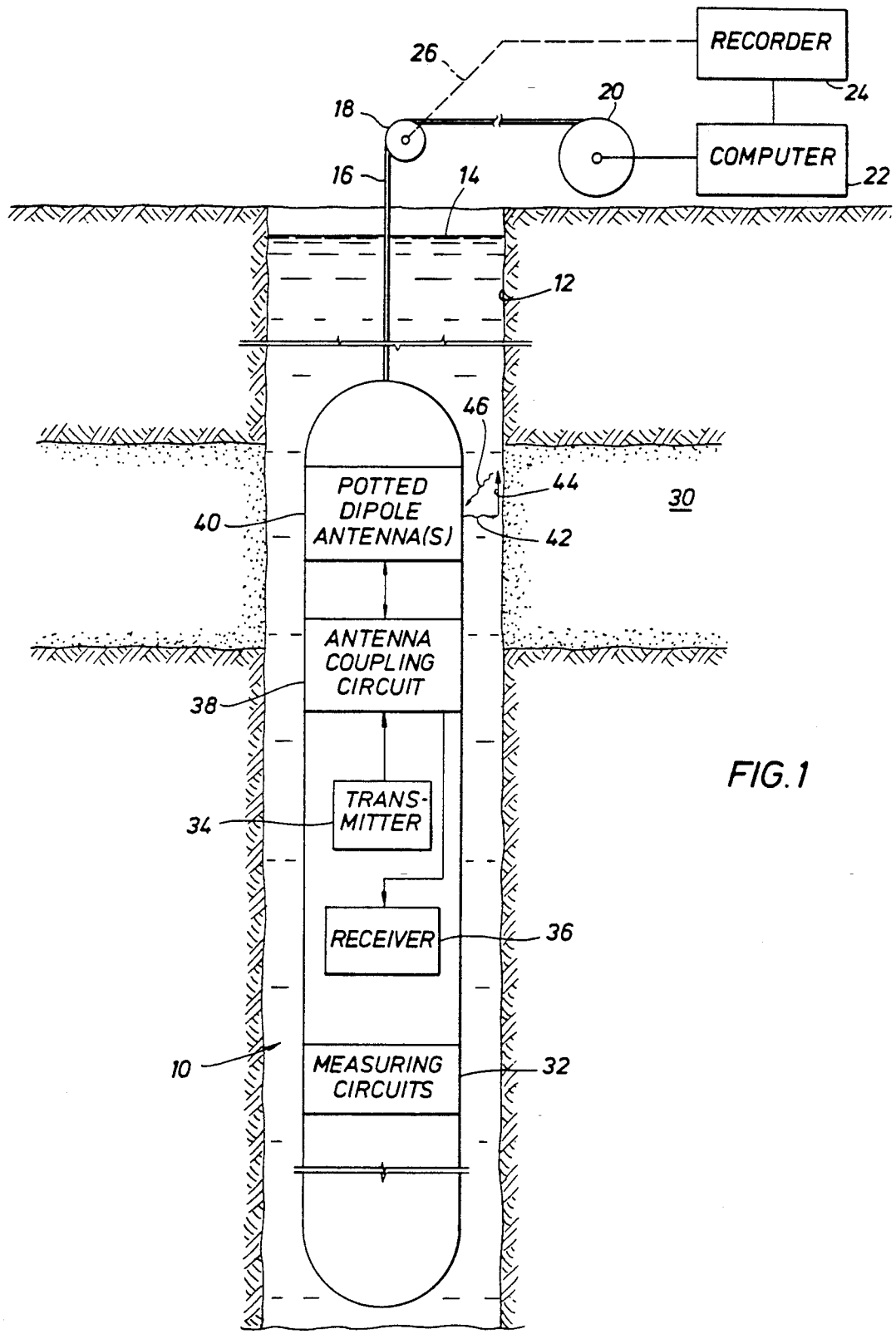
FIG. 1 shows a logging tool supported in a well borehole for conducting logging operations in accordance with the teachings of the present disclosure wherein an antenna system is included in the sonde for transmission into the well borehole and into the adjacent formations for obtaining measurements responsive to the transmitted signal and the received signal includes both reflected and refracted components.

Attention is now directed to FIG. 1 of the drawings where the numeral 10 identifies a logging tool supported in a well borehole 12 for conducting logging operations. Ordinarily, these operations are conducted in drilling fluid and hence, the drilling mud forms a column 14 which submerges the tool. The sonde incorporates a leak proof housing which is able to withstand the rugged environmental conditions in which the tool is used, and it is supported on a logging cable 16 which encloses one or more conductors for delivery of data to the surface. The logging cable 16 passes over a sheave 18 and is spooled for storage on a drum 20. The drum or reel typically will support several thousand feet of logging cable so that logging can be carried out along the full length of the well 12. Data is delivered through the conductors in the logging cable 16 to some type of data processing equipment including a CPU which is identified at 22. The data obtained from operation of the tool is delivered to a recorder 24. It is recorded as a function of depth. An electrical or mechanical depth measuring device 26 forms a depth measurement signal which is delivered to the recorder so that the data can be related to the various formations. There is a representative formation 30 which is shown in the single drawing, and it is desirable to make appropriate measurements from the sonde 10 of characteristics of the formation 30.

The present apparatus involves the interface of several concentric layers. Normally, the well 12 is uncased at this stage. That is, there is no steel casing which is cemented in place. Rather, the drilling fluid 14 fills the well and is the first media within the well. There is the interface between the drilling fluid and the adjacent formations penetrated by the well and that has the form of a concentric cylinder which is positioned around the sonde 10. The sonde may sway slightly during retrieval; however, it is represented at the center of the well and is surrounded by the concentric interface between two media. The first media is the drilling fluid 14; the second media is the formation 30. There may be a mud cake build-up on the sidewall of the borehole 12 and that may create additional interfaces. The mud cake is typically made by the solid particles in the drilling fluid. Depending on the nature of the formation 30, fluids from the mud may penetrate into the formation. This defines what is known as the invaded zone. The dimensions on the mud cake in the invaded zone vary widely depending on the nature of the mud and the formation which has been penetrated by the borehole. Typical dimensions may locate the interface between the drilling fluid and the formation with a diameter of about 6-10 inches because most drill bits form a hole in the range of about 7-9 inches in diameter. Obviously, larger or smaller drill bits will form different diameter holes. If there is a mud cake, it typically is a fraction of an inch in thickness. If the fluid which makes up the mud penetrates into the formation 30, the invaded zone can be just a few inches in diameter, but it also can be quite large. Invaded zones thus can have a diameter ranging from a negligible measure up to several feet.

The present apparatus incorporates several measuring circuits 32 in the sonde. There is also a transmitter 34 and a receiver 36. These typically connect with one or more antenna coupling circuits 38. They in turn connect with one or more antennas 40. The representation for the antenna, being one or more, is shown in a very general fashion; it is believed that the precise design of the antenna, whether helical or spiral, can be obtained from well known reference texts regarding such antennas. The antenna will be described for one embodiment as a potted antenna meaning the antenna has been surrounded with an encapsulating ceramic. The ceramic material provides a different, indeed very high, dielectric constant. The value of this will be noted below. In general terms, there is a transmitted wave 42 which radiates outwardly. It travels through the first media and is incident at the first interface. Again, other interfaces may be involved but this description will exemplify operation using only a single interface. This interface is defined by the drilling fluid 14 and the formation 30. Dependent on a number of factors, the wave 42 may penetrate into the formation 30; it may be directed parallel to the interface as indicated at 44. There is a return radiation 46 which is received by the receiver 36 and which is measured by the measuring device 32 so that information can be obtained. The received signal 46 may be purely a reflected signal, purely a refracted wave, or an unknown mix of both. The present disclosure is particularly helpful in overcoming the difficulties arising from mixed reflected and refracted signals where the amount of each is unknown and cannot be determined.

Speaking very generally, and ignoring the wavelength of the transmitted signal, assume that a typical or conventional signal is transmitted, and that return signal 46 is observed at the receiver and measured. At this juncture, it is impossible to determine the portions thereof which are reflected and refracted signals. The present disclosure, however, contemplates transmission with a circular polarized antenna emission. Assume for purposes of description that the polarization is clockwise. That is, the transmitted signal is provided with circular polarization so that the discrimination between reflected and refracted return signals can be obtained. Assuming a reflected signal, there is a phase reversal. That is, the emitted transmitted signal having a circular polarization is reflected to become a received signal, but the polarization is in the opposite hand. By contrast, if the received signal 46 is solely obtained from refraction, then it will synchronize with the transmitted signal and have the common or same clockwise hand in the polarized received component. The receiver antenna is thus made sensitive to the same hand polarization and is able to discriminate against the unwanted contrary polarization. By the use of multiple receiver antennas, it is possible to receive the same polarized signal (hence refracted) and receive an opposite hand signal (hence reflected), or to receive the sum of both without discrimination. This is particularly helpful in determining the relative amplitude of the reflected and the refracted waves. As an easy example, if one is ten times larger than the other, the small one can simply be discarded because the composite or addition of the two signals is substantially unaltered as will be obvious on inspection of the trigonometric relationship necessary to add together the reflected and the refracted signals. On the other hand, there may be a complete failure to receive one or the other dependent on a number of variables.

A cylindrical cavity antenna (typically pad supported and surrounded by a metal face while the cavity is filled with space or other dielectric) is shown in FIG. 2 and has two probes oriented orthogonal to each other. Two identical signals differing in phase by 90° and having appropriate frequency are fed to these probes. At the aperture of this antenna which is in contact with the formation, a circularly polarized electromagnetic signal is radiated into the formation.

The receiver is an identical cylindrical cavity with two probes orthogonal to each other. Assumign there is an interface, such as a mud cake, on the formation, a reflected wave will be returned to the receiver. Also arriving at the receiver is a refracted wave. If the original EM wave leaving the transmitter was right circularly polarized, the refracted wave will be right circularly polarized while the reflected wave will be left circularly polarized. If the signals from the two orthogonal probes are added together, the resultant signal is a measure of the refracted signal. If the signals from the orthogonal probes are subtracted, the resultant signal is a measure of the reflected signal. By processing the probe signals, one can determine both the reflected and refracted signals. Thus, FIGS. 2 and 3 show pad located separate antenna systems.

As stated earlier in the present disclosure, it is possible that the wave length is relatively long so that the spacing between the sonde 10 and the interface between the drilling fluid and formation is so close that there is no penetration. On the other hand, and especially when operating in the gigahertz range, the interface may be so far removed from the transmitter that the signal is simply absorbed and there is no return signal at all. When operating in the gigahertz range, if the signal has to travel through mud that is just an inch or so in thickness prior to illuminating the interface, the signal simply may not get there depending on the absorption characteristics of the drilling fluid. In summary, that also can be separately distinguished based on the response at the receiver 36.

When considering the operation of the present apparatus in the range of about 10 through about 200 Mhz, and particularly for use at 20 to 30 Mhz, the antenna is ideally potted: the potting material as noted above is a piezoelectric ceramic which completely surrounds the antenna. The physical wave length is changed by the increase of the dielectric constant. Rather than operate the antenna in space or in an open air chamber within the sonde 10, it is then operated within the ceramic material where the dielectric constant is several hundred, indeed about 1300 for the PZT4 material mentioned above. This helps in reducing the size of the antenna. This helps in providing an antenna that will fit within the sonde 10.

The response of the several interfaces to the signals irradiating the formation 30 should be noted. At some frequencies, the mud is not very transparent; at other frequencies, the radiation may well penetrate the interface between the mud and the mud cake, the interface between the mud cake and the formation 30 and pass all the way through the invaded region of the formation 30. This typically can be obtained when operating at low frequencies. In any case, such adjustments in antenna frequency either in a potted environment (a high dielectric constant), or operating in space enables operating at preferred frequencies ranging from 10 Khz for certain tools on up to the gigahertz range for other types of tools.

In summary, the present disclosure sets forth an antenna system involving transmission from an antenna of circular polarization signals at a selected frequency. The present disclosure has discussed operations at the gigahertz range all the way down to about 20 Khz. The response can be sorted out, namely the signals which are returned directly as a result of reflection and separately as refracted waves can be sorted out; this helps define the received constituents of the signal so that reflected-refracted signal interferences can be overcome and more accurate and useful data can be obtained. While the foregoing is directed to the preferred embodiment, the scope is determined by the claims which follow.

What is claimed is:

1. A method of transmitting and receiving electromagnetic waves in the frequency range from 20 megahertz to 2.0 gigahertz from a sonde positioned for logging in a well borehole, comprising the steps of:

forming a continuous circularly polarized electromagnetic wave in the aforesaid frequency range and having a known primary direction of circular polarization for transmission by an antenna supported by the sonde and radiating said known primary direction circularly polarized wave from said antenna in the well borehole for propagation in the borehole and the surrounding earth formations, and receiving, at a second, longitudinally spaced location from the location of said transmitting antenna, a returned electromagnetic wave resulting from the propagation of said known direction circularly polarized electromagnetic wave, and determining the direction of polarization of said received electromagnetic wave.

2. The method of claim 1 wherein polarization in a first direction of the received electromagnetic wave identifies a refracted wave, and polarization in the opposite direction identifies a reflected wave.

3. The method of claim 1 including the step of positioning identical transmitter and receiver antennas on a common pad adapted to be pressed against the borehole wall.

4. The method of claim 1 including the step of momentarily positioning a sonde supported pad having the transmitter antenna thereon wherein the pad is positioned for transmission from the pad into the formations adjacent the well borehole, and including the step of raising the sonde to periodically repeat the step of transmission into the formation at different depths in the well borehole, and further including the step of receiving signals returned by the formation toward the sonde at a receiver antenna supported by the sonde, and wherein the antenna responds to indicate the direction of circular polarization of the received signal.

5. The method of claim 1 wherein the transmitted signal is subjected to both reflection and refraction during propagation in the borehole and earth formations, and wherein the received signal is separated into components having the same and opposite polarization directions as the transmitted signal.

6. The method of claim 1, and including the step of surrounding the transmitting antenna with a material having a high dielectric constant to thereby shorten the wave length of the transmitted signal in said high dielectric material and reduce the physical size of the transmitting antenna.

7. The method of claim 1 including the step of positioning the antenna to transmit in a direction generally radially outwardly from the sonde with circular polarization.

8. An apparatus for conducting a survey of formations adjacent to a well borehole the apparatus comprising:
  (a) a transmitter means for forming a signal to be transmitted in the frequency range from 20 megahertz to 2.0 gigahertz;
  (b) transmitter antenna means connected to said transmitter for forming a transmitted signal, said antenna means forming a signal having a known direction of circular polarization and for transmitting said signal into the borehole and surrounding earth formation;
  (c) receiver antenna means longitudinally spaced from said transmitter antenna for receiving a signal returned by formations adjacent to the well borehole as a result of operation of said transmitter; and
  (d) said receiver means further including means responsive to polarization of the received returned signal thereat for indicating the direction thereof, wherein the direction of polarization indicates reflected or refracted waves.

9. The apparatus of claim 8 wherein said transmitting antenna includes a circular cavity, and means therein for forming a circular polarized signal.

10. The apparatus of claim 9 wherein said transmitter and receiver are mounted within a sonde adapted to be raised in a well borehole, and are connected with transmitting and receiving antenna means supported by said sonde, and said antenna means are located for contact against the surrounding well borehole wall.

11. The apparatus of claim 9 wherein said transmitter and antenna are supported in a sonde supported on the end of a logging cable having electrical conductors therein, and further including a surface located computer and recorder connected to the logging cable to receive signals from sonde supported equipment.

12. The apparatus of claim 8 wherein said transmitter and receiver antenna means are surrounded by high dielectric constant material to thereby reduce the size of said transmitter and receiver antenna means.

* * * * *